United States Patent
Odani et al.

(10) Patent No.: US 9,825,498 B2
(45) Date of Patent: Nov. 21, 2017

(54) ARMATURE AND ARMATURE MANUFACTURING METHOD

(71) Applicant: ASMO CO., LTD., Kosai, Shizuoka-pref. (JP)

(72) Inventors: Koji Odani, Tahara (JP); Akihiko Seki, Toyokawa (JP)

(73) Assignee: ASMO Co., Ltd., Kosai (JP)

( * ) Notice: Subject to any disclaimer, the term of this patent is extended or adjusted under 35 U.S.C. 154(b) by 557 days.

(21) Appl. No.: 14/296,466

(22) Filed: Jun. 5, 2014

(65) Prior Publication Data

US 2014/0368078 A1 Dec. 18, 2014

(30) Foreign Application Priority Data

Jun. 14, 2013 (JP) .................................. 2013-126013

(51) Int. Cl.
*H02K 23/30* (2006.01)
*H02K 15/08* (2006.01)
(Continued)

(52) U.S. Cl.
CPC ........... *H02K 3/28* (2013.01); *H02K 15/0031* (2013.01); *H02K 23/30* (2013.01); *Y10T 29/49009* (2015.01)

(58) Field of Classification Search
CPC ........ H02K 3/04; H02K 3/28; H02K 15/0031; H02K 15/0442; H02K 15/0464;
(Continued)

(56) References Cited

U.S. PATENT DOCUMENTS

2006/0220489 A1* 10/2006 Osawa ................... H02K 23/28
310/198
2011/0095638 A1* 4/2011 Sakata ................... H02K 23/20
310/179
(Continued)

FOREIGN PATENT DOCUMENTS

CN 102611231 A 7/2012
DE 102011081035 * 2/2013 ............. H02K 23/30
(Continued)

OTHER PUBLICATIONS

Roos et al., Machine Translation of DE102011081035, Feb. 2013.*
(Continued)

*Primary Examiner* — Quyen Leung
*Assistant Examiner* — Eric Johnson
(74) *Attorney, Agent, or Firm* — SOLARIS Intellectual Property Group, PLLC

(57) ABSTRACT

An armature including a core that includes plural teeth extending in a radial shape, and that has a slot formed between each of the plural teeth; a plurality of first winding coil sections formed by winding coil wire plural times spanning different respective sets of least two of the teeth, while shifting by one slot each time toward one side in the circumferential direction of the core; and a plurality of second winding coil sections formed by winding coil wire plural times spanning different respective sets of least two of the teeth, while shifting by one slot each time toward the other side in the circumferential direction of the core.

10 Claims, 10 Drawing Sheets

(51) Int. Cl.
*H02K 3/28* (2006.01)
*H02K 15/00* (2006.01)

(58) Field of Classification Search
CPC .. H02K 15/0435; H02K 15/08; H02K 15/085;
H02K 15/09; H02K 15/095; H02K 23/30
USPC .................................................. 310/198, 206
See application file for complete search history.

(56) References Cited

U.S. PATENT DOCUMENTS

| | | | |
|---|---|---|---|
| 2011/0198960 A1* | 8/2011 | Tang ........................ | H02K 3/28 310/198 |
| 2012/0242183 A1* | 9/2012 | Tokumasu ............... | H02K 3/28 310/195 |

FOREIGN PATENT DOCUMENTS

| | | |
|---|---|---|
| JP | 2005-269781 A | 9/2005 |
| WO | 2013/080374 A1 | 6/2013 |

OTHER PUBLICATIONS

English language translation of the following: Office Action dated Aug. 30, 2016 from JPOA in a Japanese patent application No. 2013-126013 corresponding to the instant patent application.
English language translation of the following: Office action dated Aug. 1, 2017 from the SIPO in a Chinese patent application No. 201410256129.9 corresponding to the instant patent application.

* cited by examiner

FIG.5
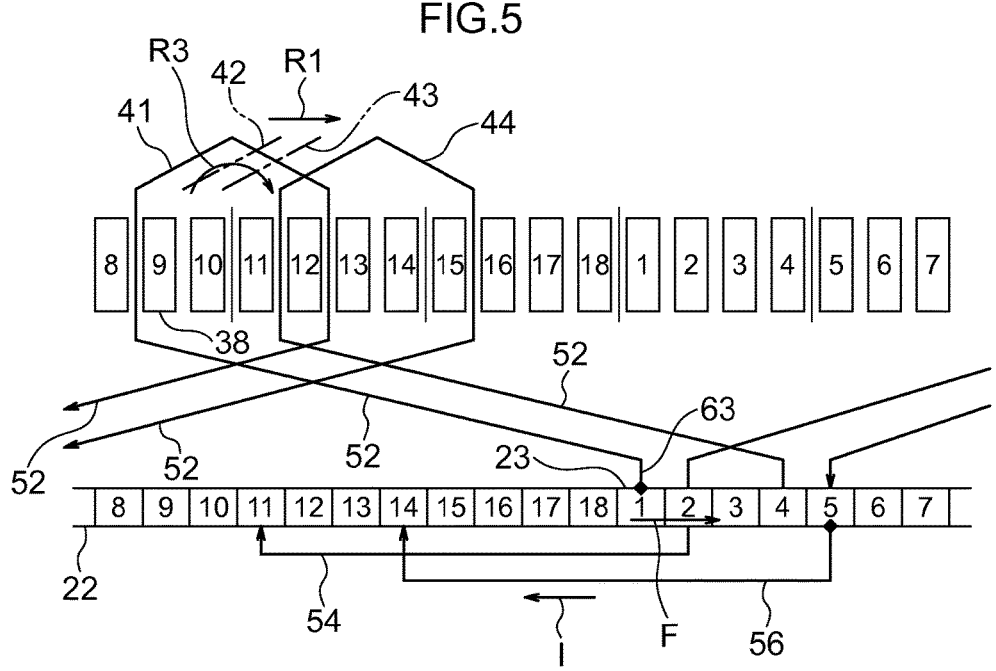
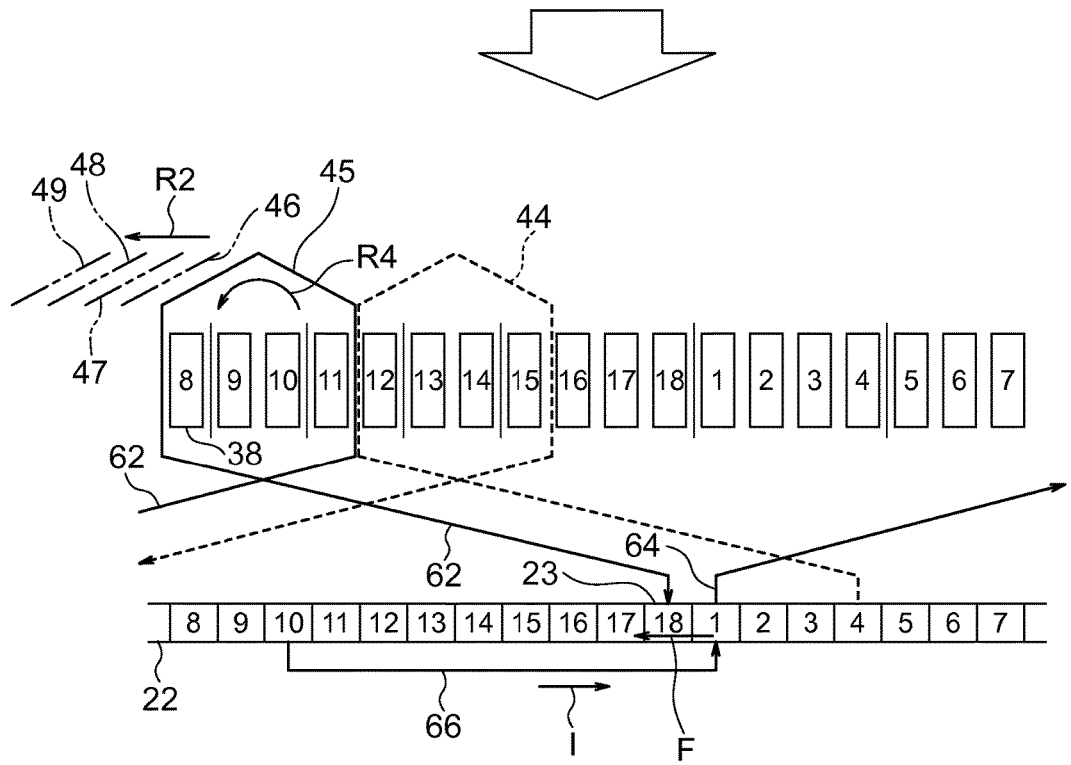

FIG.6
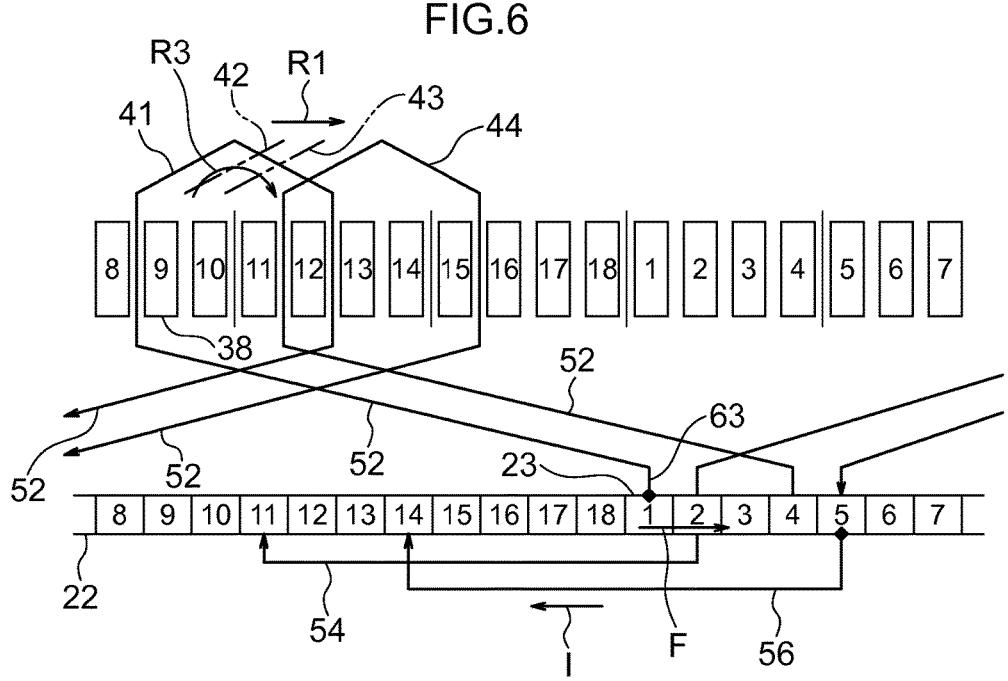
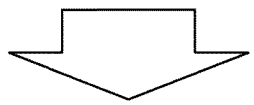
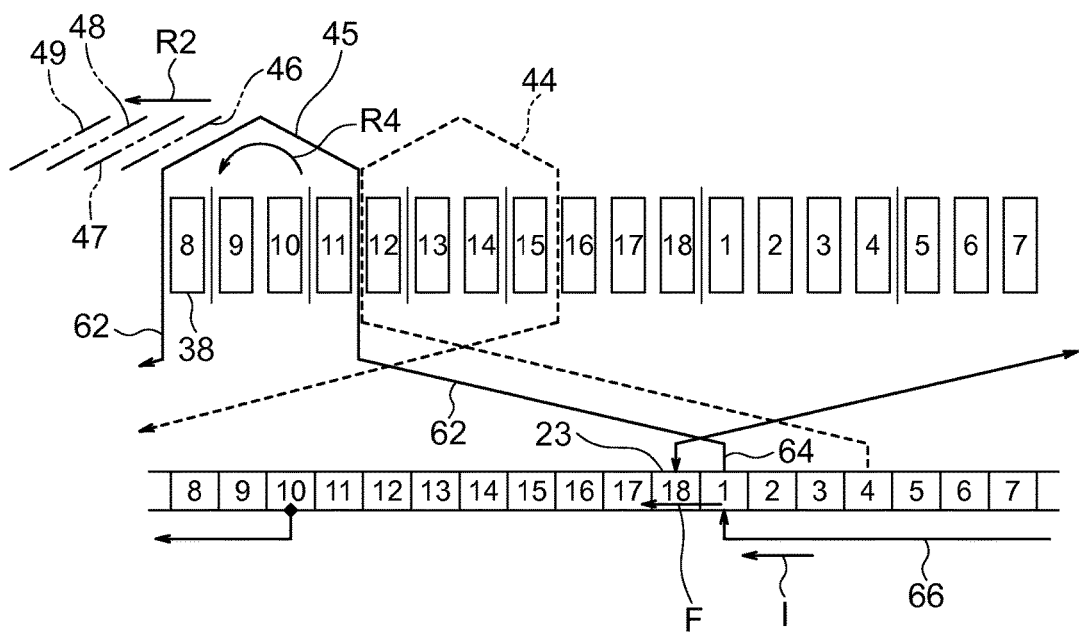

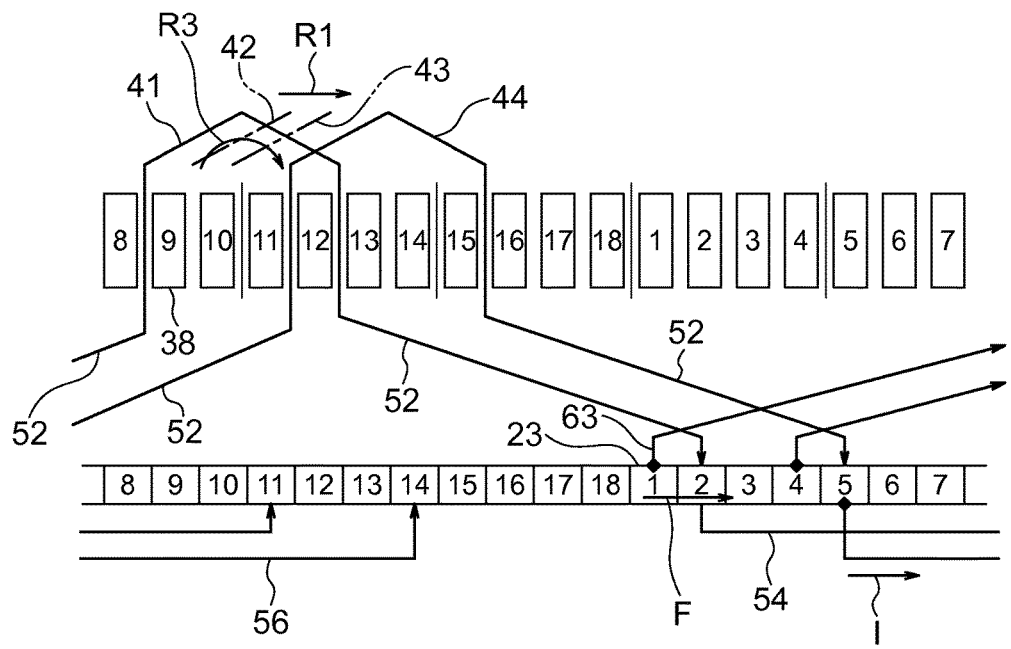
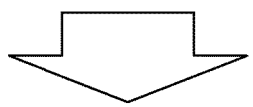
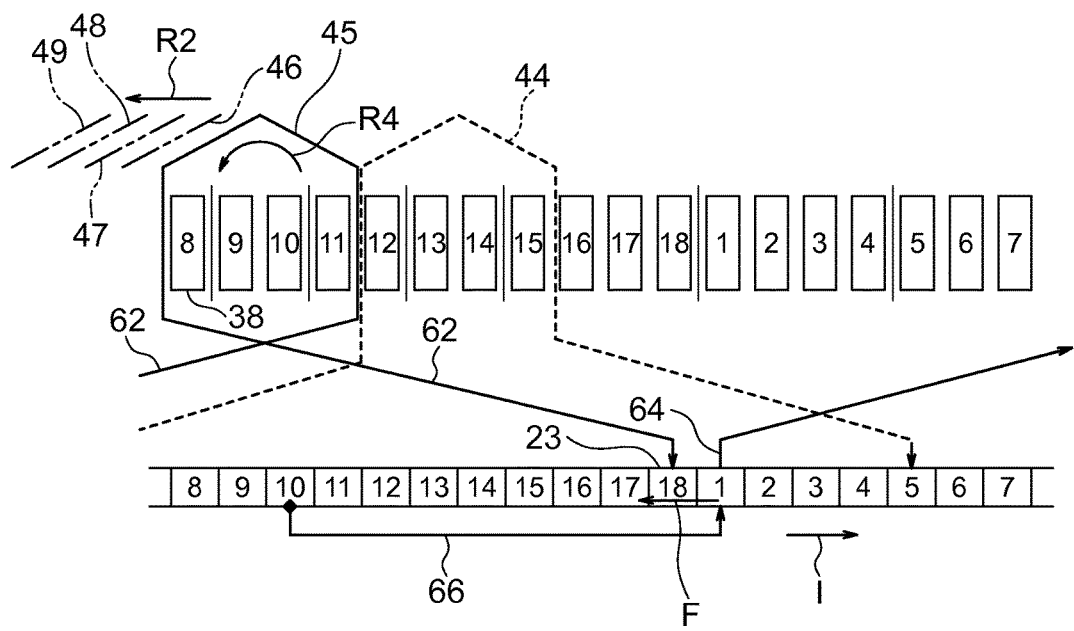
FIG.7

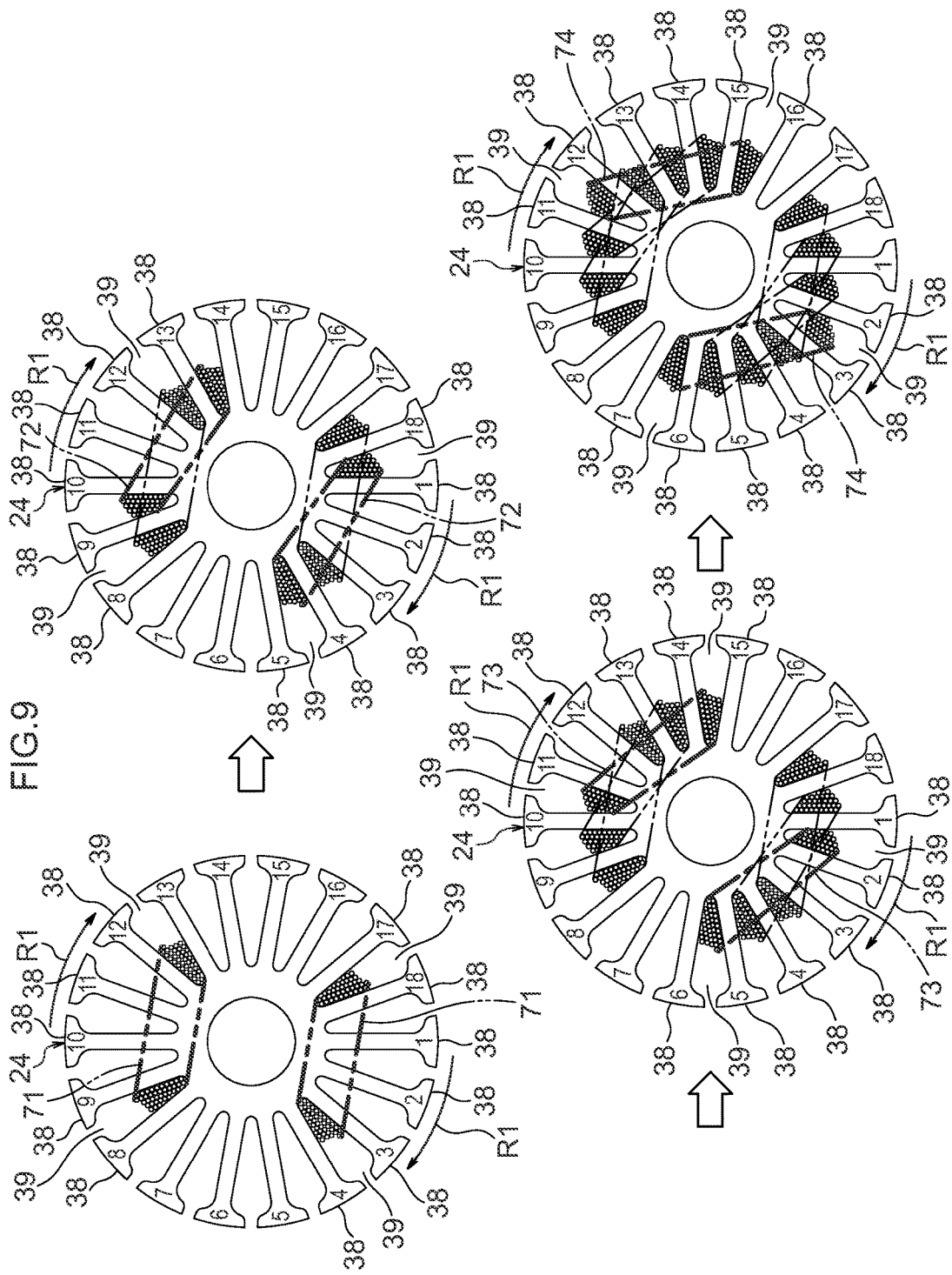

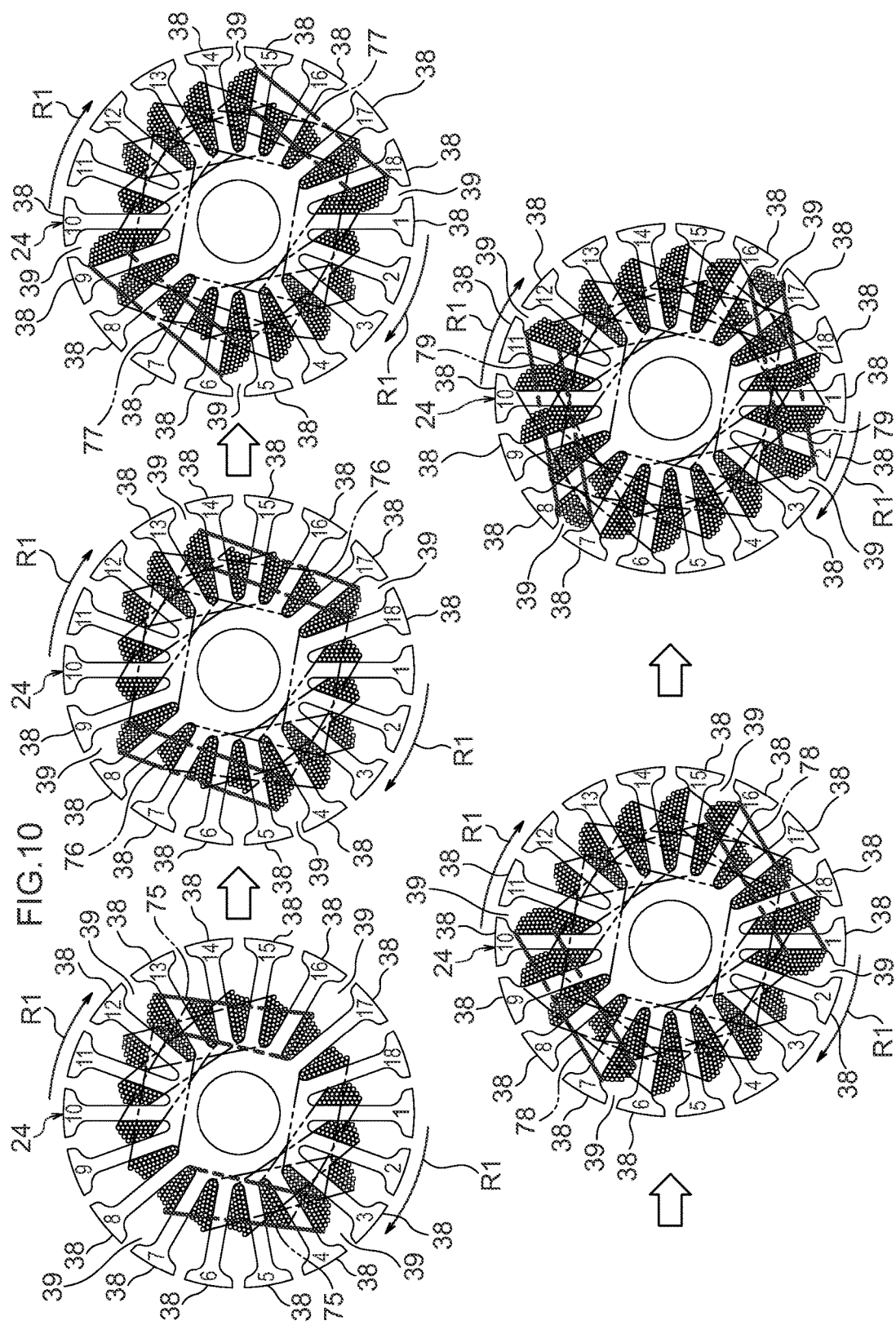

ARMATURE AND ARMATURE MANUFACTURING METHOD

CROSS-REFERENCE TO RELATED APPLICATION

This application claims priority under 35 USC 119 from Japanese Patent Application, No. 2013-126013 filed Jun. 14, 2013, the disclosure of which is incorporated by reference herein.

BACKGROUND OF THE INVENTION

Technical Field

The present invention relates to an armature and an armature manufacturing method.

Related Art

Conventional known armatures are equipped with a core that includes plural teeth extending in a radial shape, and plural winding coil sections (see for example Japanese Patent Application Laid-Open (JP-A) No. 2005-269781).

Such an armature has a slot formed between each of the plural teeth, and the plural winding coil sections are each wound plural times spanning plural corresponding teeth, while shifting one slot each time toward one side in the circumferential direction of the core.

SUMMARY

However, due to accumulation of overlapping layers in the plural winding coil sections in such conventional armatures, the winding coil sections are provided at positions near to an outer periphery of the armature in certain slots. Such cases make it difficult to improve the coil winding area factor.

An object of the present invention is therefore to enable the coil space factor to be improved.

In order to resolve the issue described above, an armature of a first aspect includes: a core including plural teeth extending in a radial shape with a slot formed between each of the plural teeth; first winding coil sections formed in plural layers by winding coil wire plural times spanning different respective sets of least two of the teeth, while shifting by one slot each time toward one side in the circumferential direction of the core; and second winding coil sections formed in plural layers by winding coil wire plural times spanning different respective sets of least two of the teeth, while shifting by one slot each time toward the other side in the circumferential direction of the core.

In this armature, the first winding coil sections are formed in plural layers by winding coil wire plural times spanning different respective sets of least two of the teeth, while shifting by one slot each time toward one side in the circumferential direction of the core. Moreover, as opposed to the plural first winding coil sections described above, the plural second winding coil sections are each wound plural times spanning at least two of the corresponding teeth, while shifting by one slot each time toward the other side in the circumferential direction of the core. This enables winding of the winding coil sections at positions close the outer peripheral end of the core to be suppressed from occurring in any of the slots, thereby enabling the coil winding area factor to be improved.

An armature of a second aspect is the armature of the first aspect, wherein an end portion at one side in the core circumferential direction of a final wound layer out of the plural first winding coil sections is provided such that the coil wire is wound so as to be disposed flat against one side face of the tooth, from a base end side to a leading end side of the tooth.

In this armature, the end portion at one side in the core circumferential direction of a final wound layer out of the plural first winding coil sections is formed such that the coil wire is wound so as to be disposed flat against a side face of the tooth, from a base end side to a leading end side of the tooth. This enables space to be secured at one side in the circumferential direction of the core, due to the flat providing of the coil wire in the slot where the one end portion at one side in the core circumferential direction of the first winding coil section has been inserted. This enables end portion at the other side in the core circumferential direction of the second winding coil section to be disposed in the space, thereby enabling winding of the winding coil sections at positions close the outer peripheral end of the core to be suppressed from occurring in any of the slots.

A third aspect is an example of the first aspect or the second aspect, wherein: the core includes 18 teeth as the plural teeth; the plural first winding coil sections form $1^{st}$ layer to $4^{th}$ layer first winding coil sections, each wound plural times spanning a different set of four of the teeth; and the plural second winding coil sections form $5^{th}$ layer to $9^{th}$ layer second winding coil sections that start winding at the slot where the end portion at the other side in the core circumferential direction of the $4^{th}$ layer first winding coil section, forming the final layer of the plural first winding coil sections, has been inserted. The $5^{th}$ layer to $9^{th}$ layer second winding coil sections are each wound plural times spanning a different set of four of the teeth.

An armature of a fourth aspect is the armature of the first aspect or the second aspect, wherein the plural first winding coil sections and the plural second winding coil sections are each wound across at least two of the teeth in a tightening direction.

In this armature, the plural first winding coil sections and the plural second winding coil sections are each wound across at least two of the corresponding teeth in the tightening direction. This thereby enables loosening of the first winding coil sections and the second winding coil sections to be suppressed, both during and after winding of the coil.

An armature of a fifth aspect is the armature of the first aspect or the second aspects, wherein: the plural first winding coil sections are each wound across a set of at least two of the teeth in a tightening direction; and the plural second winding coil sections are each wound across a set of at least two of the teeth in a loosening direction.

In this armature, the plural first winding coil sections are each wound across at least two of the corresponding teeth in the tightening direction. This enables space to be secured at both opening end portions of the slots where the first winding coil section has been inserted. Then, using the space described above, the second winding coil sections are each wound across at least two of the corresponding teeth in the loosening direction. This enables interference between the first winding coil sections and the second winding coil sections to be suppressed at both opening end portions of the slots where the first winding coil sections have been inserted.

An armature of a sixth aspect is the armature of the first aspect or the second aspect, wherein: the plural first winding coil sections are each wound across a set of at least two of the teeth in a loosening direction; and the plural second winding coil sections are each wound across a set of at least two of the teeth in a tightening direction.

In this armature, the first winding coil sections configuring a lower layer are each wound across at least two of the corresponding teeth in the loosening direction, and the plural second winding coil sections configuring an upper layer are each wound across at least two of the corresponding teeth in the tightening direction. This enables the lower layer first winding coil section to be held by the upper layer second winding coil section, enabling loosening of the first winding coil sections to be suppressed.

In order to resolve the issue described above, a manufacturing method of an armature of a seventh aspect includes: a first process of, on a core including plural teeth extending in a radial shape and with a slot formed between each of the plural teeth, winding plural first winding coil sections by winding coil wire plural times spanning different respective sets of at least two teeth, while shifting one slot each time toward one side in the circumferential direction of the core; and a second process of winding plural second winding coil sections by winding coil wire plural times spanning different respective sets of at least two teeth, while shifting one slot each time toward the other side in the circumferential direction of the core.

This armature manufacturing method enables the winding coil sections to be suppressed from overlapping in any of the slots, enabling the winding coil sections to be suppressed from protruding from the slots, and thereby enabling the coil winding area factor to be improved.

BRIEF DESCRIPTION OF THE DRAWINGS

FIG. 5 is a diagram explaining a method of connecting the first winding coil sections and the second winding coil sections to the commutator illustrated in FIG. 1;

FIG. 6 is a diagram explaining a first modified example of a method of connecting the first winding coil sections and the second winding coil sections to the commutator illustrated in FIG. 1;

FIG. 7 is a diagram explaining a second modified example of a method of connecting the first winding coil sections and the second winding coil sections to the commutator illustrated in FIG. 1;

FIG. 9 is a diagram explaining a method to wind winding coil sections from a 1st layer to a 4th layer onto the core illustrated in FIG. 8; and FIG. 10 is a diagram explaining a method to wind winding coil sections winding from a 5th layer to a 9th layer onto the core illustrated in FIG. 8.

DETAILED DESCRIPTION OF THE INVENTION

Explanation follows regarding an exemplary embodiment of the present invention, with reference to the drawings.

Figure 1:
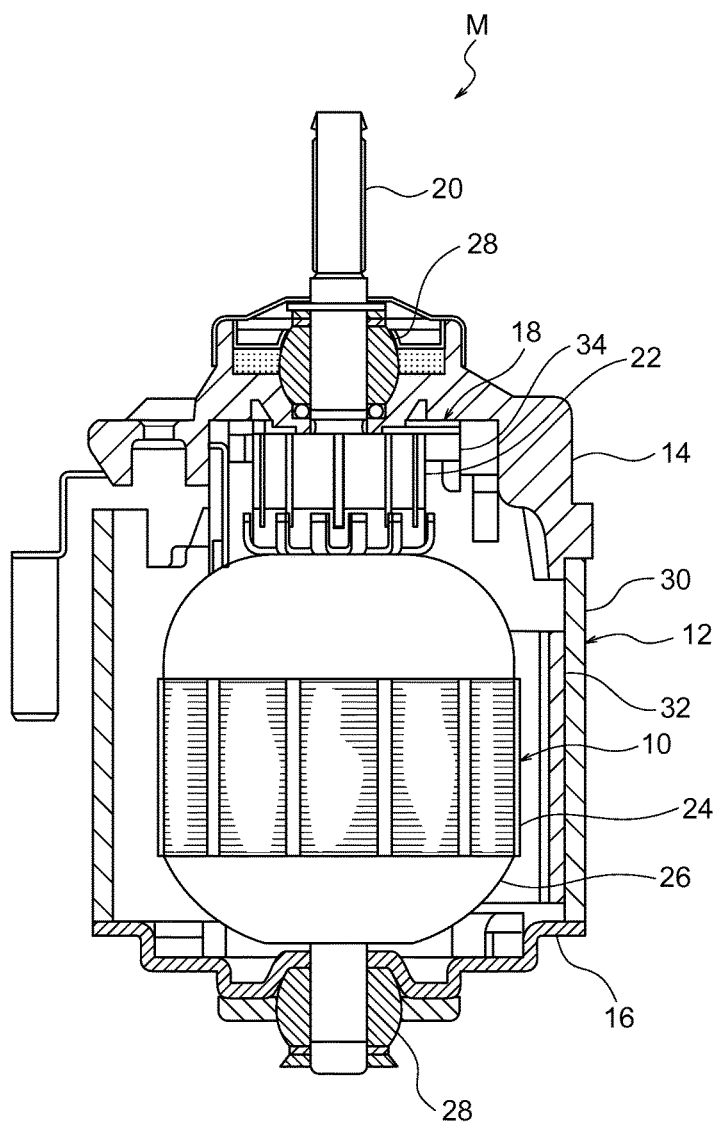
FIG. 1 is a side cross-section of a rotating electrical device according to an exemplary embodiment of the present invention.

As illustrated in FIG. 1, a rotating electrical device M according to an exemplary embodiment of the present invention is a brushed DC motor, equipped with an armature 10, a stator 12, a front housing 14, an end housing 16, and a brush device 18.

The armature 10 includes a shaft 20, a commutator 22, a core 24 and a coil 26. The shaft 20 is rotatably supported by a pair of shaft bearings 28 provided to the front housing 14 and the end housing 16 respectively, and the commutator 22 and the core 24 are fixed to the shaft 20. The coil 26 is wound onto the core 24, and a terminal portion of the coil 26 is connected to the commutator 22.

The stator 12 includes a yoke 30 and a magnet 32. The yoke 30 is formed in a circular tube shape, and the armature 10 is accommodated inside the yoke 30. The magnet 32 is fixed to the inner peripheral face of the yoke 30 by bonding or the like, and faces the armature 10 along the radial direction.

The front housing 14 is fixed to an end portion on one side in an axial direction of the yoke 30, and the end housing 16 is fixed to another end portion on the other side in the axial direction of the yoke 30. The brush device 18 is fixed to the front housing 14, and a brush 34 contacting the commutator 22 is provided to the brush device 18.

In the rotating electrical device M, when current is supplied to the brush 34, the current flows through the commutator 22 into the coil 26. Electromagnetic force acts between the current flowing in the coil 26 and the magnetic field of the magnet 32, rotating the armature 10.

Figure 2:
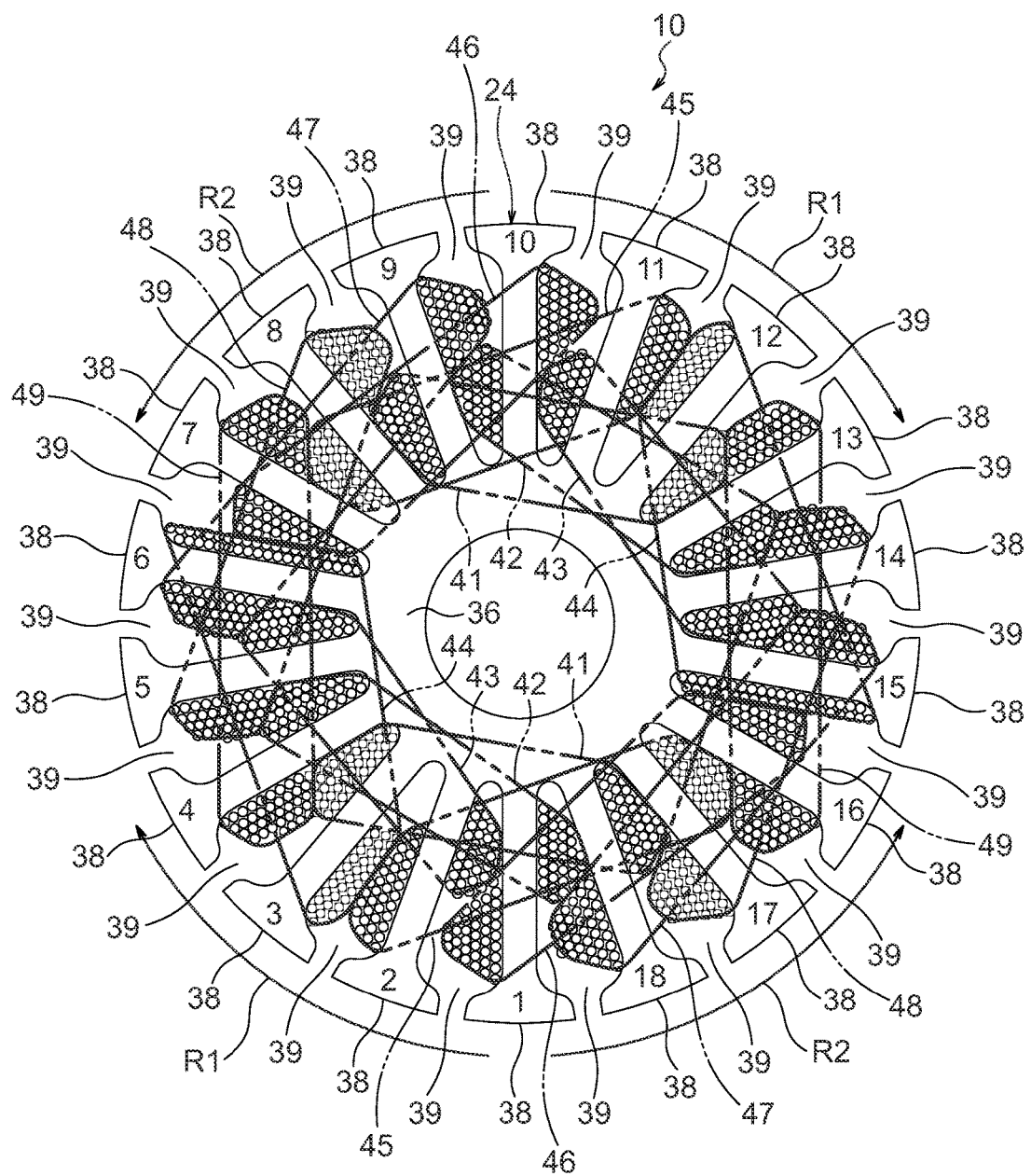
FIG. 2 is a plan view of the armature illustrated in FIG. 1.

Specifically, as illustrated in FIG. 2, the core 24 of the armature 10 described above includes a ring-shaped portion 36 and plural teeth 38. In the present exemplary embodiment, the number of the plural teeth 38 is, as an example, set as 18. Namely, the rotating electrical device M including the armature 10 is configured as a 4-pole, 18-slot motor. The plural teeth 38 extend in a radial shape from the ring-shaped portion 36 toward the radial direction outside of the core 24, and a slot 39 is formed between each of the plural teeth 38.

The coil 26 wound onto the core 24 includes first winding coil sections 41 to 44 which configure $1^{st}$ layer to $4^{th}$ layer, and second winding coil sections 45 to 49 which configure $5^{th}$ layer to $9^{th}$ layer. The first winding coil sections 41 to 44 and the second winding coil sections 45 to 49 are wound onto the plural teeth 38 as described below.

Explanation follows regarding a method of winding the first winding coil sections 41 to 44 configuring the $1^{st}$ layer to $4^{th}$ layer, and the second winding coil sections 45 to 49 configuring the $5^{th}$ layer to $9^{th}$ layer onto the plural teeth 38 as a manufacturing method of the armature 10, and more detailed explanation is given regarding configuration of the armature 10.

Note that in the present exemplary embodiment, the first winding coil sections 41 to 44 and the second winding coil sections 45 to 49 are each provided as sets of winding coil sections at two locations. The winding coil sections of each set are disposed with point symmetry to each other about the central portion of the core 24.

Figure 3:
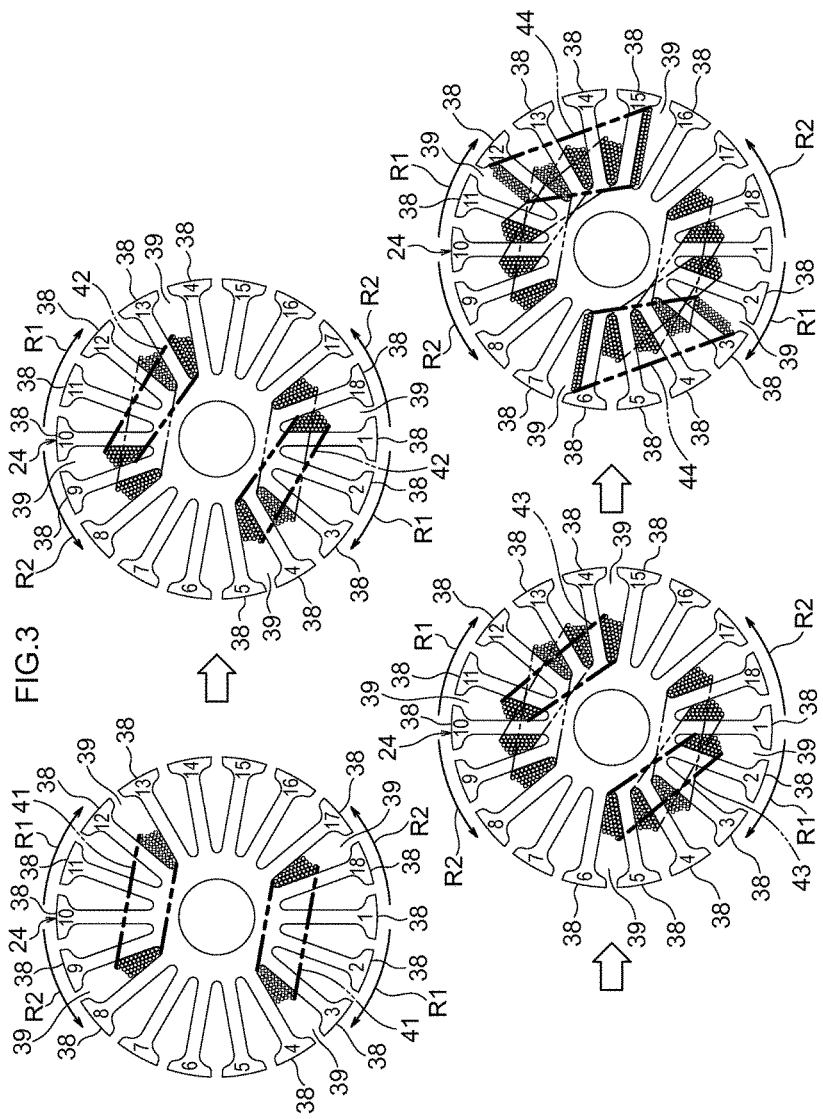
FIG. 3 is a diagram explaining a method of winding first winding coil sections from a 1st layer to a 4th layer onto the core illustrated in FIG. 2.

First, as illustrated in FIG. 3, the first winding coil sections 41 to 44, configuring a lower layer, are each wound plural times spanning four corresponding teeth 38, while shifting one slot each time toward the arrow R1 side, that is one side in the circumferential direction of the core 24.

Namely, of the set of $1^{st}$ layer winding coil sections in two locations, one of the first winding coil sections 41 is wound plural times spanning the four teeth 38 from number 9 to number 12, and the other first winning coil section 41 is wound plural times spanning the four teeth 38 from number 18 to number 3.

Moreover, of the set of $2^{nd}$ layer winding coil sections in two locations, one of the first winding coil sections 42, shifted by one slot to the arrow R1 side with respect to the one $1^{st}$ layer first winding coil section 41, is wound plural times spanning the four teeth 38 from number 10 to number 13, and the other first winding coil section 42, shifted by one slot to the arrow R1 side with respect to the other $1^{st}$ layer first winding coil section 41, is wound plural times spanning the four teeth 38 from number 1 to number 4.

Moreover, of the set of $3^{rd}$ layer winding coil sections in two locations, one of the first winding coil sections 43, shifted by one slot to the arrow R1 side with respect to the one $2^{nd}$ layer first winding coil section 42, is wound plural times spanning the four teeth 38 from number 11 to number 14, and the other first winding coil section 43, shifted by one slot to the arrow R1 side with respect to the other $2^{nd}$ layer first winding coil section 42, is wound plural times spanning the four teeth 38 from number 2 to number 5.

Moreover, of the set of $4^{th}$ layer winding coil sections in two locations, one of the first winding coil sections 44, shifted by one slot to the arrow R1 side with respect to the one $3^{rd}$ layer first winding coil section 43, is wound plural times spanning the four teeth 38 from number 12 to number 15, and the other first winding coil section 44, shifted by one slot to the arrow R1 side with respect to the other $3^{rd}$ layer first winding coil section 43, is wound plural times spanning the four teeth 38 from number 3 to number 6.

When this is performed, the $1^{st}$ layer to $3^{rd}$ layer first winding coil sections 41 to 43 are wound plural times such that the number of winds decreases on winding from a lower layer to an upper layer, so as to form a substantially trapezoid cross-section shape in a plan view of the core 24. Furthermore, respective end portions of the $1^{st}$ layer to $3^{rd}$ layer first winding coil sections 41 to 43 are inserted into a bottom portion side (inside in the core 24 radial direction) of the respective V-shaped slot 39.

By contrast, an arrow R1 side end portion of the one $4^{th}$ layer first winding coil section 44 is wound so as to be provided flat against a side face of the number 15 tooth 38, from the base end side to the leading end side of the tooth 38 (namely, the number of winds from the base end side to the leading end side of the number 15 tooth 38 is substantially uniform, so as to form an substantially rectangular cross-section shape in the plan view of the core 24). Moreover, an arrow R2 side end portion of the one $4^{th}$ layer first winding coil section 44 is wound so as to be provided flat against a side face of the number 12 tooth 38, further to an outside in the core 24 radial direction from the one $3^{rd}$ layer first winding coil section 43 that is wound against the side face of the number 11 tooth 38.

Similarly, an arrow R1 side end portion of the other $4^{th}$ layer first winding coil section 44 is wound so as to be provided flat against a side face of the number 6 tooth 38, from the base end side to the leading end side of the tooth 38. Moreover, an arrow R2 side end portion of the other $4^{th}$ layer first winding coil section 44 is wound so as to be provided flat against a side face of the number 3 tooth 38, further to the outside in the core 24 radial direction from the other $3^{rd}$ layer first winding coil section 43 that is wound against the side face of the number 2 tooth 38 (this thereby completes a first process).

Figure 4:
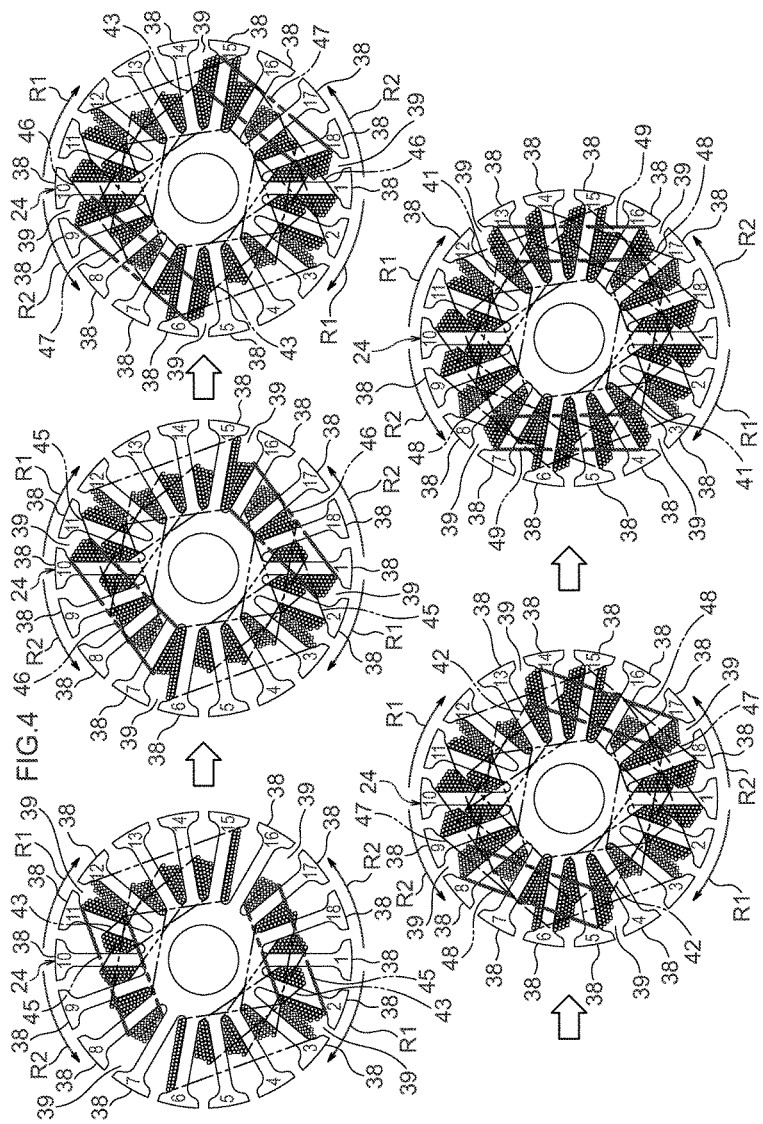
FIG. 4 is a diagram explaining a method of winding second winding coil sections from a 5th layer to a 9th layer onto the core illustrated in FIG. 2.

Next, as illustrated in FIG. 4, winding of second winding coil sections 45 to 49, configuring an upper layer, begins at the slot 39 where the arrow R2 side end portion of the $4^{th}$ layer first winding coil section 44, that is the final layer of the plural first winding coil sections 41 to 44, has been inserted. The second winding coil sections 45 to 49 configuring $5^{th}$ layer to $9^{th}$ layer are then each wound plural times spanning four corresponding teeth 38, while shifting one slot each time toward the arrow R2 side, that is the other circumferential direction side of the core 24.

Namely, of the set of $5^{th}$ layer winding coil sections in two locations, one of the second winding coil sections 45 is wound plural times spanning the four teeth 38 from number 11 to number 8, and the other second winding coil section 45 is wound plural times spanning the four teeth 38 from number 2 to number 17.

Moreover, of the set of $6^{th}$ layer winding coil sections in two locations, one of the second winding coil sections 46, shifted by one slot to the arrow R2 side with respect to the one $5^{th}$ layer second winding coil section 45, is wound plural times spanning the four teeth 38 from number 10 to number 7, and the other second winding coil section 46, shifted by one slot to the arrow R2 side with respect to the other $5^{th}$ layer second winding coil section 45, is wound plural times spanning the four teeth 38 from number 1 to number 16.

Moreover, of the set of $7^{th}$ layer winding coil sections in two locations, one of the second winding coil sections 47, shifted by one slot to the arrow R2 side with respect to the one $6^{th}$ layer second winding coil section 46, is wound plural times spanning the four teeth 38 from number 9 to number 6, and the other second winding coil section 47, shifted by one slot to the arrow R2 side with respect to the other $6^{th}$ layer second winding coil section 46, is wound plural times spanning the four teeth 38 from number 18 to number 15.

Moreover, of the set of $8^{th}$ layer winding coil sections in two locations, one of the second winding coil sections 48, shifted by one slot to the arrow R2 side with respect to the one $7^{th}$ layer second winding coil section 47, is wound plural times spanning the four teeth 38 from number 8 to number 5, and the other second winding coil section 48, shifted by one slot to the arrow R2 side with respect to the other $7^{th}$ layer second winding coil section 47, is wound plural times spanning the four teeth 38 from number 17 to number 14.

Moreover, of the set of $9^{th}$ layer winding coil sections in two locations, one of the second winding coil sections 49, shifted by one slot to the arrow R2 side with respect to the one $8^{th}$ layer second winding coil section 48, is wound plural times spanning the four teeth 38 from number 7 to number 4, and the other second winding coil section 49, shifted by one slot to the arrow R2 side with respect to the other $8^{th}$ layer second winding coil section 48, is wound plural times spanning the four teeth 38 from number 16 to number 13.

When this is performed, the $5^{th}$ layer to $9^{th}$ layer second winding coil sections 45 to 49 are wound plural times such that the number of winds decreases on progression from a lower layer to an upper layer, so as to form a substantially trapezoid cross-section shape in the plan view of the core 24. Moreover, an arrow R1 side end portion of the one $5^{th}$ layer second winding coil section 45 is inserted into a space on the arrow R2 side (the number 11 tooth 38 side) of the slot 39 between the number 11 and the number 12 teeth 38, further to the outside in the core 24 radial direction from the one $3^{rd}$ layer first winding coil section 43 (wound against the side face of the number 11 tooth 38). Moreover, an arrow R2 side end portion of the one $5^{th}$ layer second winding coil section 45 is inserted into the slot 39 between the number 7 and the number 8 teeth 38. Similarly to the one $5^{th}$ layer second winding coil section 45, the arrow R1 side end portion of the other $5^{th}$ layer second winding coil section 45 is inserted at the R2 side (the number 2 tooth 38 side) of the slot 39 between the number 2 and the number 3 teeth 38, further to the outside in the core 24 radial direction from the other 3$^{rd}$ layer second winding coil section 43 (wound against the side face of the number 2 tooth 38). Moreover, the arrow R2 side end portion of the other 5$^{th}$ layer second winding coil section 45 is inserted in the slot 39 between the number 16 and the number 17 teeth 38.

Moreover, an arrow R1 side end portion of the one 6$^{th}$ layer second winding coil section 46 is inserted into the slot 39 between the number 10 and the number 11 teeth 38, further to the outside in the core 24 radial direction from the one 3$^{rd}$ layer first winding coil section 43. Moreover, an arrow R2 side end portion of the one 6$^{th}$ layer second winding coil section 46 is inserted into a space at the arrow R1 side (the number 7 tooth 38 side) of the slot 39 between the number 6 and the number 7 teeth 38. Similarly to the one 6$^{th}$ layer second winding coil section 46, the two end portions of the other 6$^{th}$ layer second winding coil section 46 are respectively inserted into the slot 39 between the number 1 and the number 2 teeth 38, and the slot 39 between the number 15 and the number 16 teeth 38.

Moreover, an arrow R1 side end portion of the one 7$^{th}$ layer second winding coil section 47 is inserted into the slot 39 between the number 9 and the number 10 teeth 38, further to the outside in the core 24 radial direction from the one 2$^{nd}$ layer first winding coil section 42. Moreover, an arrow R2 side end portion of the one 7$^{th}$ layer second winding coil section 47 is inserted into the slot 39 between the number 5 and the number 6 teeth 38, further to the outside in the core 24 radial direction from the other 3$^{rd}$ layer first winding coil section 43. Similarly to the one 7$^{th}$ layer second winding coil section 47, the two end portions of the other 7$^{th}$ layer second winding coil section 47 are respectively inserted into the slot 39 between the number 1 and the number 18 teeth 38, and the slot 39 between the number 14 and the number 15 teeth 38.

Moreover, an arrow R1 side end portion of the one 8$^{th}$ layer second winding coil section 48 is inserted into the slot 39 between the number 8 and the number 9 teeth 38, further to the outside in the core 24 radial direction from the one 1$^{st}$ layer first winding coil section 41. Moreover, an arrow R2 side end portion of the one 8$^{th}$ layer second winding coil section 48 is inserted into the slot 39 between the number 4 and the number 5 teeth 38, further to the outside in the core 24 radial direction from the other 2$^{nd}$ layer first winding coil section 42. Similarly to the one 8$^{th}$ layer second winding coil section 48, the two end portions of the other 8$^{th}$ layer second winding coil section 48 are respectively inserted into the slot 39 between the number 17 and the number 18 teeth 38, and the slot 39 between the number 13 and the number 14 teeth 38.

Moreover, an arrow R1 side end portion of the one 9$^{th}$ layer second winding coil section 49 is inserted into the slot 39 between the number 7 and the number 8 teeth 38, further to the outside in the core 24 radial direction from the one 5$^{th}$ layer second winding coil section 45. Moreover, an arrow R2 side end portion of the one 9$^{th}$ layer second winding coil section 49 is inserted into the slot 39 between the number 3 and the number 4 teeth 38, further to the outside in the core 24 radial direction from the other 1$^{st}$ layer first winding coil section 41. Similarly to the one 9$^{th}$ layer second winding coil section 49, the two end portions of the other 9$^{th}$ layer second winding coil section 49 are respectively inserted into the slot 39 between the number 16 and the number 17 teeth 38, and the slot 39 between the number 12 and the number 13 teeth 38.

In this way, the 5$^{th}$ layer to the 9$^{th}$ layer second winding coil sections 45 to 49 configuring the upper layer are efficiently inserted into spaces inside the remaining slots 39 after winding the 1$^{st}$ layer to 4$^{th}$ layer first winding coil sections 41 to 44 configuring the lower layer (thereby completing a second process).

As illustrated in the upper diagram in FIG. 5, the 1$^{st}$ layer to 4$^{th}$ layer first winding coil sections 41 to 44 configuring the lower layer described above are each wound across the four corresponding teeth 38 in a tightening direction. Namely, the 1$^{st}$ layer to 4$^{th}$ layer first winding coil sections 41 to 44 are respectively wound across the four corresponding teeth 38 such that a pair of connecting wires 52, extending from the two end portions of the respective first winding coil sections 45 to 49, intersect with each other. When this is performed, the 1$^{st}$ layer to 4$^{th}$ layer of the first winding coil sections 41 to 44 are wound on by positive rotation (rotation in the arrow R3 direction) of a flyer.

When this is performed, one of each of the 1$^{st}$ layer to 4$^{th}$ layer first winding coil sections 41 to 44 are hooked from the number 1 to number 5 segments 23 (connecting hooks) of the commutator 22. The hooking direction F is set as the opposite direction to an index direction I (the rotation direction of the armature 10). Furthermore, the number 5 segment 23 and number 14 segment 23 are connected by a shorting wire 56, and the number 2 segment 23 and number 11 segment 23 are connected by a shorting wire 54. The 1$^{st}$ layer to 4$^{th}$ layer of the other of the first winding coil sections 41 to 44 are connected to the commutator 22 at positions rotated 180 degrees about the commutator 22 axis with respect to the 1$^{st}$ layer to 4$^{th}$ layer of the one first winding coil sections 41 to 44.

Then, after cutting the coil 26, as illustrated in the lower diagram in FIG. 5, the 5$^{th}$ layer to 9$^{th}$ layer second winding coil sections 45 to 49 configuring the upper layer are each wound across the corresponding four teeth 38 in the tightening direction by reverse rotation (rotation in the arrow R4 direction) of the flyer. Namely, the 5$^{th}$ layer to 9$^{th}$ layer second winding coil sections 45 to 49 are each wound across four corresponding teeth 38 such that a pair of connecting wires 62 extending from the two end portions of the respective second winding coil sections 45 to 49 intersect with each other.

When this is performed, the 5$^{th}$ layer to 9$^{th}$ layer of the one second winding coil sections 45 to 49 are hooked from the number 18 to number 14 segments 23 of the commutator 22. The hooking direction F is set as the opposite direction to the index direction I (the rotation direction of the armature 10). Moreover, a winding-start terminal portion 63 extending from the 1$^{st}$ layer to 4$^{th}$ layer first winding coil sections 41 to 44, and a winding-finish terminal portion 64 extending from the 5$^{th}$ layer to 9$^{th}$ layer second winding coil sections 45 to 49, are hooked to the common number 1 segment 23. Furthermore, the number 10 segment 23 and the number 1 segment 23 are connected by a shorting wire 66. The 5$^{th}$ layer to 9$^{th}$ layer of the other second winding coil sections 45 to 49 are connected to the commutator 22 at positions rotated 180 degrees about the commutator 22 axis with respect to the 5$^{th}$ layer to 9$^{th}$ layer of the one second winding coil sections 45 to 49.

Explanation follows regarding operation and advantageous effects of the exemplary embodiment of the present invention.

Figure 8:
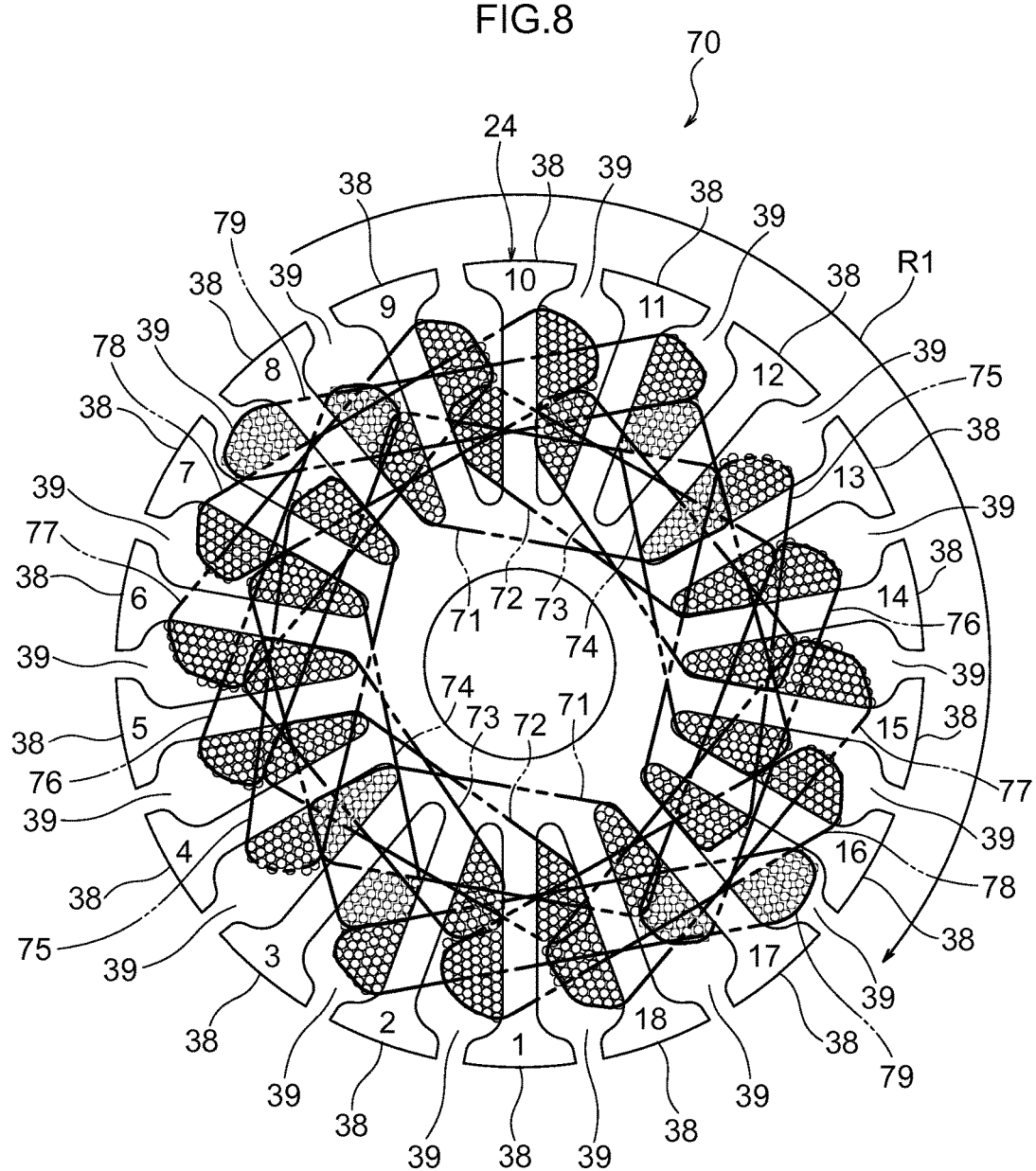
FIG. 8 is a plan view of an armature according to a Comparative Example.

Explanation first follows regarding a Comparative Example, in order to clarify the operation and advantageous effects of the exemplary embodiment of the present invention. An armature 70 according to the Comparative Example illustrated in FIG. 8 is provided with a core 24 and a $1^{st}$ layer to a $9^{th}$ layer of winding coil sections 71 to 79. The core 24 is configured similarly to the present exemplary embodiment described above. As illustrated in FIG. 9 and FIG. 10, the plural winding coil sections 71 to 79 are each wound plural times spanning four corresponding teeth 38, while shifting one slot each time toward the arrow R1 side, that is one side in the circumferential direction of the core 24.

However, as illustrated in FIG. 10, in the armature 70 according to the Comparative Example, at the stage when the $5^{th}$ layer winding coil section 75 has been wound, the slot 39 between the number 12 and the number 13 teeth 38, and the slot 39 between the number 3 and the number 4 teeth 38 are almost filled by the $5^{th}$ layer winding coil section 75, such that the winding coil sections 77 to 79 from the $7^{th}$ layer onwards need to be wound at the vicinity of an outer peripheral edge of the core 24. As a result, at the slot 39 where the $9^{th}$ layer winding coil section 79 portion has been inserted, the $9^{th}$ layer winding coil section 79 is wound on at position close the outer peripheral end of the core, making it difficult for the area factor of the coil 26 to be improved.

In contrast thereto, as illustrated in FIG. 4, in the exemplary embodiment of the present invention, winding of the $5^{th}$ layer to $9^{th}$ layer second winding coil sections 45 to 49 starts at the slot 39, where the arrow R2 side end portion of the $4^{th}$ layer first winding coil section 44 that is the final layer of the plural first winding coil sections 41 to 44 has been inserted. The $5^{th}$ layer to $9^{th}$ layer second winding coil sections 45 to 49 are then each wound across the four corresponding teeth 38, while shifting by one slot each time in the opposite direction to the $1^{st}$ layer to $4^{th}$ layer first winding coil sections 41 to 44.

Moreover, the arrow R1 side end portion of the one $4^{th}$ layer winding coil section is wound so as to be provided flat and wound evenly against the side face of the number 15 tooth 38, from the base end side to the leading end side of the tooth 38, and the arrow R1 side end portion of the other $4^{th}$ layer winding coil section is wound so as to be provided flat and wound evenly against the side face of the number 6 tooth 38, from the base end side to the leading end side of the tooth 38. Due to this flat arranging, space is secured at the arrow R2 side of the slots 39 where the arrow R1 side end portions of the $4^{th}$ layer first winding coil sections 44 have been inserted, and by disposing the arrow R2 side end portions of the $6^{th}$ layer second winding coil sections 46 in this space, space is secured for disposing the $9^{th}$ layer second winding coil sections 49. This enables winding of the winding coil sections at the positions close the outer peripheral end of the core to be suppressed from occurring in any of the slots 39, thereby enabling the area factor of the winding coil 26 to be improved.

Moreover, as illustrated in FIG. 5, the plural first winding coil sections 41 to 44, and the plural second winding coil sections 45 to 49 are each wound across four corresponding teeth 38 in the tightening direction. This thereby enables loosening of the first winding coil sections 41 to 44 and the second winding coil sections 45 to 49 to be suppressed, both during and after winding of the coil.

Explanation follows regarding modified examples of the exemplary embodiment of the present invention.

In the exemplary embodiment described above, the $1^{st}$ layer to $4^{th}$ layer first winding coil sections 41 to 44 and the $5^{th}$ layer to $9^{th}$ layer second winding coil sections 45 to 49 are each wound across the four corresponding teeth 38 in the tightening direction. However, as illustrated in FIG. 6, the $5^{th}$ layer to $9^{th}$ layer second winding coil sections 45 to 49 may each be wound across the four corresponding teeth 38 in a loosening direction, namely, wound across the four corresponding teeth 38 such that the pair of connecting wires 62 extending from the two end portions of the respective second winding coil sections 45 to 49 each extends in opposing directions (so as not to intersect with each other).

Such a configuration enables space to be secured at both opening end portions of the slots in which the first winding coil sections 41 to 44 have been inserted. The second winding coil sections 45 to 49 are then each wound across the four corresponding teeth 38 in the loosening direction, while using the above space. This enables interference between the first winding coil sections 41 to 44 and the second winding coil sections 45 to 49 to be suppressed at both opening end portions of the slots 39 where the first winding coil sections 41 to 44 have been inserted.

Moreover, in the above exemplary embodiment, as illustrated in FIG. 7, the $1^{st}$ layer to $4^{th}$ layer first winding coil sections 41 to 44 may each be wound across the four corresponding teeth 38 in the loosening direction, and the $5^{th}$ layer to $9^{th}$ layer second winding coil sections 45 to 49 may each be wound across the four corresponding teeth 38 in the tightening direction Such a configuration enables the lower layer first winding coil sections 41 to 44 to be held by the upper layer second winding coil sections 45 to 49, enabling loosening of the first winding coil sections 41 to 44 to be suppressed.

Although in the exemplary embodiment described above the armature 10 includes 18 teeth, another number of teeth may be employed. Namely, the rotating electrical device M may be a motor other than a 4-pole, 18-slot motor. Moreover, the plural first winding coil sections 41 to 44 and second winding coil sections 45 to 49 may each be wound plural times spanning at least two corresponding teeth.

Although the armature 10 is equipped with plural of the first winding coil sections 41 to 44 and second winding coil sections 45 to 49, plural third winding coil sections may be provided in addition to these.

Although the rotating electrical device M is configured as a brushed DC motor, configuration may be made as a brushless motor. The exemplary embodiment described above may also be applied to an armature of a brushless motor.

In the event that modified examples described above are combinable, the plural modified examples may be combined as appropriate.

Although an exemplary embodiment of the invention is explained above, the present invention is not limited thereto, and it goes without saying that various other modifications may be implemented within a range not departing from the spirit of the present invention.

What is claimed is:

1. An armature comprising:
   a core including a plurality of teeth extending in a radial shape with a slot formed between each adjacent pair of the plurality of teeth;
   first winding coil sections formed in a plurality of layers by winding coil wire a plurality of times spanning different respective sets of at least two of the teeth, a winding start position of the coil of each of the plurality of layers being shifted by one slot each time, consecutively, toward a first direction in the circumferential direction of the core; and
   second winding coil sections formed in a plurality of layers by winding coil wire a plurality of times spanning different respective sets of at least two of the teeth, a winding start position of the coil of each of the plurality of layers being shifted by one slot each time, consecutively, toward a second direction that is opposite to the first direction in the circumferential direction of the core,
wherein a winding start position of a first layer of the second winding coil sections is positioned at a slot where a first direction side end portion of a final layer of the first winding coil sections has been inserted, and
wherein the plurality of layers of the second winding coil sections are respectively shifted by one slot each time consecutively, toward the second direction.

2. The armature of claim 1, wherein:
an end portion at one side in the core circumferential direction of a final wound layer among the plurality of the first winding coil sections is wound so as to be flat against one side face of one of the teeth, from a base end side to a leading end side of the one of the teeth.

3. The armature of claim 1, wherein:
the plurality of teeth includes eighteen teeth;
the plurality of the first winding coil sections form $1^{st}$ layer to $4^{th}$ layer first winding coil sections, each wound a plurality of times spanning a different set of four of the teeth; and
the plurality of the second winding coil sections form $5^{th}$ layer to $9^{th}$ layer second winding coil sections that start winding at the slot where an end portion at the other side in the core circumferential direction of the $4^{th}$ layer first winding coil section has been inserted, the $4^{th}$ layer first winding coil section forming the final layer of the plurality of the first winding coil sections, and that are each wound a plurality of times spanning a different set of four of the teeth.

4. The armature of any one of claim 1, wherein:
the plurality of the first winding coil sections and the plurality of the second winding coil sections are each wound across at least two of the teeth in a tightening direction.

5. The armature of any one of claim 1, wherein:
the plurality of the first winding coil sections are each wound across a set of at least two of the teeth in a tightening direction; and
the plurality of the second winding coil sections are each wound across a set of at least two of the teeth in a loosening direction.

6. The armature of claim 1, wherein:
the plurality of the first winding coil sections are each wound across a set of at least two of the teeth in a loosening direction; and
the plurality of the second winding coil sections are each wound across a set of at least two of the teeth in a tightening direction.

7. The armature of claim 1, wherein:
the coil wire is wound in a clockwise direction in each layer of the plurality of layers of the first winding coil sections, and
the coil wire is wound in a counter-clockwise direction in each layer of the plurality of layers of the second winding coil sections.

8. The armature of claim 1, wherein the first layer through the final layer of the first winding coil sections are disposed one after another from a lower side toward an upper side on the plurality of teeth and slots, and portions of the first layer through the final layer of the second winding coil sections are disposed one after another on the plurality of the layers of the first winding coil sections.

9. A method of manufacturing an armature comprising:
on a core including a plurality of teeth extending in a radial shape and with a slot formed between each adjacent pair of the plurality of teeth, forming a plurality of first winding coil sections with a plurality of layers by winding coil wire a plurality of times spanning different respective sets of at least two teeth, while shifting a winding start position of the coil wire of each of the plurality of layers one slot each time, consecutively, toward a first direction in the circumferential direction of the core; and
forming a plurality of second winding coil sections with a plurality of layers by winding coil wire a plurality of times spanning different respective sets of at least two teeth, while shifting a winding start position of the coil wire of each of the plurality of layers one slot each time, consecutively, toward a second direction that is opposite to the first direction in the circumferential direction of the core,
wherein a winding start position of a first layer of the second winding coil sections is positioned at a slot where a first direction side end portion of a final layer of the first winding coil sections has been inserted, and
wherein the plurality of layers of the second winding coil sections are respectively shifted by one slot each time consecutively, toward the second direction.

10. The method of manufacturing an armature of claim 9, wherein:
the coil wire is wound in a clockwise direction in each layer of the plurality of layers of the first winding coil sections, and
the coil wire is wound in a counter-clockwise direction in each layer of the lurality of layers of the second winding coil sections.

* * * * *